US009527769B2

(12) United States Patent
Mauro et al.

(10) Patent No.: US 9,527,769 B2
(45) Date of Patent: Dec. 27, 2016

(54) REVERSE PHOTOCHROMIC BOROSILICATE GLASSES

(71) Applicant: CORNING INCORPORATED, Corning, NY (US)

(72) Inventors: John Christopher Mauro, Corning, NY (US); Lynn Marie Thirion, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/508,548

(22) Filed: Oct. 7, 2014

(65) Prior Publication Data

US 2015/0099130 A1    Apr. 9, 2015

Related U.S. Application Data

(60) Provisional application No. 61/888,680, filed on Oct. 9, 2013.

(51) Int. Cl.
| | |
|---|---|
| *C03C 3/083* | (2006.01) |
| *C03C 3/089* | (2006.01) |
| *C03C 3/091* | (2006.01) |
| *C03C 3/11* | (2006.01) |
| *C03C 21/00* | (2006.01) |
| *C03C 4/06* | (2006.01) |
| *C03C 3/093* | (2006.01) |
| *C03C 17/02* | (2006.01) |
| *C03C 23/00* | (2006.01) |
| *C03C 8/02* | (2006.01) |

(52) U.S. Cl.
CPC ............. *C03C 21/002* (2013.01); *C03C 3/089* (2013.01); *C03C 3/093* (2013.01); *C03C 4/06* (2013.01); *C03C 8/02* (2013.01); *C03C 17/02* (2013.01); *C03C 23/002* (2013.01); *C03C 2204/04* (2013.01)

(58) Field of Classification Search
None
See application file for complete search history.

(56) References Cited

U.S. PATENT DOCUMENTS

| 3,208,860 A | 9/1965 | Armistead ...................... 106/54 |
| 3,306,833 A * | 2/1967 | O'Leary ................. C03C 3/091 204/157.45 |
| 3,703,388 A | 11/1972 | Araujo ............................ 106/47 |
| 3,734,754 A | 5/1973 | Randall ........................... 106/47 |
| 4,018,965 A | 4/1977 | Kerko et al. ..................... 355/71 |
| 4,025,191 A | 5/1977 | Seward, III ................... 428/410 |
| 4,125,405 A | 11/1978 | Araujo et al. .................. 106/54 |
| 4,190,451 A | 2/1980 | Hares et al. .................... 106/47 |
| 4,608,349 A | 8/1986 | Kerko et al. ................... 501/13 |
| 2008/0254372 A1 * | 10/2008 | Wu .......................... G03H 1/02 430/2 |
| 2008/0254373 A1 * | 10/2008 | Wu .......................... G03H 1/02 430/2 |

FOREIGN PATENT DOCUMENTS

GB       1252649 A  *  11/1971  ............... C03C 4/06

OTHER PUBLICATIONS

Gy, "Ion exchange for glass strengthening," Materials Science and Engineering B, 149 (2008) 159-165).*
Kraevskii, et al., Interface models for the photochromism and themochromism of glasses with nanocrystals, Oct. 5, 2001, *Journal of Non-Crystalline Solids*, vol. 316, (2003), pp. 372-383.
Nolan, et al., Optical Absorption of Silver in Photochromic Glasses: Optically Induced Dichroism, May-Jun. 1980, *Journal of the American Ceramic Society*, vol. 63, No. 5-6, pp. 305-308.
Kraevskii, et al, The Nature of Thermochromic Effect in Glasses with AgCl and CuCl Microcrystals, May 27, 2001, *Glass Physics and Chemistry*, vol. 28, No. 1, 2001, pp. 11-24.
Inoue, et al., Thermochromic property of tellurite glasses containing transition metal oxides, Jan. 17, 1995, *Journal of Non-Crystalline Solids*, vol. 189 (1995), pp. 36-42.
Abe, et al., Thermochromism in Reduced Phosphate Glasses, Sep. 29, 1980, *Journal of the American Ceramic Society*, vol. 64, No. 4, pp. 206-209.
Seward, III, Thermally darkenable photochromic glasses, Oct. 25, 1974, *Journal of Applied Physics*, vol. 46 pp. 689-694.
International Search Report and Written Opinion, dated Jan. 7, 2015, pp. 1-8, International Patent Application No. PCT/US2014/059623, European Patent Office, The Netherlands.
W.H. Armistead and S.D. Stookey; "Photochromic Silicate Glasses Sensitized by Silver Halides"; Science 133, 150 (1964).

* cited by examiner

*Primary Examiner* — David Sample (57) ABSTRACT

Borosilicate glasses are disclosed having (in weight %) 66-76% $SiO_2$, 0-8% $Al_2O_3$, 10-18% $B_2O_3$, 0-4% $Li_2O$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade. Such reverse photochromic borosilicate glass compositions may be thermally darkenable. The borosilicate glasses may be strengthened via ion-exchange strengthening treatment. The borosilicate glasses may retain their reverse photochromic and thermally darkenable properties even after ion-exchange strengthening treatment.

20 Claims, 8 Drawing Sheets
(7 of 8 Drawing Sheet(s) Filed in Color)

*616GB – 15 min. LED exp.

616GC

616GC – 15 min LED exp.

616GD

616GD – 15 min. LED exp.

REVERSE PHOTOCHROMIC BOROSILICATE GLASSES

This application claims the benefit of priority under 35 U.S.C. §120 of U.S. Application Ser. No. 61/888,680 filed on Oct. 9, 2013 the content of which is relied upon and incorporated herein by reference in its entirety.

BACKGROUND

The present disclosure relates to borosilicate glasses that display reverse photochromic and thermally darkenable behavior. The disclosure also relates to articles made from such borosilicate glasses, precursor glasses for such borosilicate glasses, and methods for obtaining such borosilicate glasses and related articles.

SUMMARY

Typical photochromic glasses darken in response to ultraviolet (UV) irradiation and revert to a colorless or near colorless thermally stable state when UV irradiation ceases. There are many applications for such photochromic glasses including sunglasses, industrial applications such as sensors, and novelty items such as toys. Such typical photochromic glasses are commonly formed of borosilicate.

On the other hand, there are certain applications which would require a "reverse" photochromic glass, wherein the glass is colored, or darkened, in the ground state and lightens upon exposure to UV irradiation, the color, or darkening, returning as the glass reverts to the ground state. Such applications include privacy glass, such as a window that is more transparent in the daytime to allow natural lighting in a room, but which darkens at nighttime either for privacy or to contain the artificial lighting indoors. Other applications include sensors in which a reverse photosensitive glass is required.

However, "reverse" photochromic glasses have heretofore been composed of silica-free, alkali-free lanthanum borate. Such borate glasses are highly hygroscopic and ill-suited for applications in which moisture is or may be present. Moreover, borate glasses typically have lower thermal stability and chemical durability than borosilicate glasses and require expensive, heavy rare earth elements. In addition, such glasses cannot be strengthened by ion-exchange processes.

Accordingly, there are needs in the art for new compositions and methods for achieving reverse photochromic glasses.

Surprisingly, the present inventors have found compositions disclosed herein provide borosilicate glasses exhibiting reverse photochromic properties. Also surprisingly, in some embodiments such borosilicate glasses may retain their reverse photochromic properties even after ion-exchange strengthening treatment. Moreover, such borosilicate glasses may be thermally darkenable. "Thermally darkenable" as used herein means the optical density of the darkened state increases with increased temperature. In some embodiments, at higher temperatures, the glass may remain dark in spite of relatively intense bleaching light.

Disclosed herein are borosilicate glasses that display reverse photochromic and thermally darkenable behavior. In some embodiments, the glasses may be chemically strengthened via an ion exchange process. In another embodiment, the reverse photochromic, thermally darkenable glasses may be used as one or more layers of a multi-layer glass laminate.

In accordance with one embodiment, a photochromic borosilicate glass composition is disclosed having (in weight %) 66-76% $SiO_2$, 0-8% $Al_2O_3$, 10-18% $B_2O_3$, 0-4% $Li_2O$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade. Such photochromic borosilicate glass composition may be thermally darkenable. For example, the composition may be thermally darkenable at a temperature of 150° C. or greater.

In an embodiment, the aforementioned photochromic borosilicate glass composition includes 2-12% $Na_2O$.

In another embodiment, a photochromic borosilicate glass composition is disclosed having (in weight %) 66-76% $SiO_2$, 0-8% $Al_2O_3$, 10-18% $B_2O_3$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade and is substantially free of $Li_2O$.

In another embodiment, a photochromic borosilicate glass composition is disclosed having (in weight %) 66-76% $SiO_2$, 0-8% $Al_2O_3$, 10-18% $B_2O_3$, 0-4% $Li_2O$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade and is substantially free of $Br^-$.

In still a further embodiment, photochromic borosilicate glass compositions may include 2-8% $Al_2O_3$, 4-12% $Na_2O$ and 0-6% $K_2O$, wherein the weight % of $Na_2O$ is greater than the weight % of $K_2O$. In this embodiment the glass composition may be substantially free of $Li_2O$ and/or $Br^-$.

In yet a further embodiment, a photochromic borosilicate glass composition includes 68.6-71.6% $SiO_2$, 3-6% $Al_2O_3$, 13.4% $B_2O_3$, 4.5-9% $Na_2O$, 0-4.5% $K_2O$, 1.2% Ag, 1.8% $Cl^-$ and 0.03% CuO, wherein the weight % of $Na_2O$ is greater than the weight % of $K_2O$ and the composition is substantially free of $Li_2O$ and $Br^-$.

In accordance with one or more embodiments, immersion of the photochromic borosilicate glass compositions disclosed herein in a molten salt bath for a predetermined time and temperature causes ion-exchange.

In accordance with a further embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 2-8% $Al_2O_3$, 10-18% $B_2O_3$, 0-4% $Li_2O$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is substantially free of $Br^-$. In another embodiment the foregoing glass composition includes 1.2% Ag and 1.8% $Cl^-$.

In another embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 2-8% $Al_2O_3$, 13.4% $B_2O_3$, 0-4% $Li_2O$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is substantially free of $Br^-$.

In another embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 2-8% $Al_2O_3$, 10-18% $B_2O_3$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is substantially free of $Br^-$ and $Li_2O$.

In accordance with still a further embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 6% $Al_2O_3$, 13.4% $B_2O_3$, 0-4% $Li_2O$, 4.5% $Na_2O$, 0-12% $K_2O$, 1.2% Ag, 1.8% $Cl^-$, 0.03% CuO and 0.03-0.06% of a summed amount of CuO and NiO, wherein the photochromic borosilicate glass composition is substantially free of $Br^-$.

In accordance with a further embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 6% $Al_2O_3$, 13.4% $B_2O_3$, 0-4% $Li_2O$, 9% $Na_2O$, 1.2% Ag, 1.85% $Cl^-$, 0.03% CuO and 0.03-0.06% of a summed amount of CuO and NiO, wherein the photochromic borosilicate glass composition is substantially free of $Br^-$ and $K_2O$.

In accordance with another embodiment, a photochromic borosilicate glass composition is disclosed, which when exposed to ultraviolet irradiation exhibits a lightening in color or shade and is thermally darkenable, the photochromic borosilicate glass composition including (in weight %) 66-76% $SiO_2$, 3% $Al_2O_3$, 13.4% $B_2O_3$, 0-4% $Li_2O$, 6% $Na_2O$, 3% $K_2O$, 1.2% Ag, 1.8% $Cl^-$, 0.03% CuO and 0.03-0.06% of a summed amount of CuO and NiO, wherein the photochromic borosilicate glass composition is substantially free of $Br^-$.

Methods are disclosed for strengthening photochromic borosilicate glasses disclosed herein. In one embodiment, a method of strengthening a glass composition includes immersing in a molten salt bath a photochromic borosilicate glass composition having (in weight %) 66-76% $SiO_2$, 2-8% $Al_2O_3$, 10-18% $B_2O_3$, 0-4% $Li_2O$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is substantially free of $Br^-$, and wherein the photochromic borosilicate glass composition is immersed in the molten salt bath for a time and at a temperature sufficient to cause ion-exchange. The temperature of the bath may be between about 350° C. and 450° C. and the predetermined period of time may be between about 6 and 10 hours. In one embodiment the molten salt bath includes $KNO_3$.

It may be advantageous to impart any number of functional properties to a substrate, such as a glass substrate by applying a layer to the substrate. Although the advantageous functional properties achieved by adding a layer to a substrate are numerous, one such functional property is photochromicity.

Through proper consideration of certain parameters of the photochromic layer (or layers) a satisfactory reverse photochromic, thermally darkenable layer may be achieved. For example, one or more aspects may involve providing a reverse photochromic borosilicate glass layer on a substrate such as another glass.

For example, an oxide glass, such as Gorilla® Glass, which is available from Corning Incorporated, has been widely used in consumer electronics products. Such glass is used in applications where the strength of conventional glass is insufficient to achieve desired performance levels. Gorilla® Glass is manufactured by chemical strengthening (ion exchange) in order to achieve high levels of strength while maintaining desirable optical characteristics (such as high transmission, low reflectivity, and suitable refractive index). Strengthened glass through ion exchange (IX) techniques can produce high levels of compressive stress in the treated glass, as high as about 400 to 1000 MPa at the surface. One or more layers of borosilicate reverse photochromic glass may be applied to a substrate such as Gorilla® Glass to provide a device having reverse photochromic properties.

Other aspects, features, and advantages will be apparent to one skilled in the art from the description herein taken in conjunction with the accompanying drawings.

DESCRIPTION OF THE DRAWINGS

The patent or application file contains at least one drawing executed in color. Copies of this patent or patent application publication with color drawings will be provided by the Patent and Trademark Office upon request and payment of the necessary fee.

For the purposes of illustration, one or more embodiments are shown in the drawings, it being understood, however, that the embodiments disclosed and described herein are not limited to the precise arrangements and instrumentalities shown.

DETAILED DESCRIPTION

Various embodiments disclosed herein are directed to reverse photochromic and thermally darkenable glasses. In order to provide a fuller understanding of how the discoveries herein were achieved, and therefore the broad scope of the contemplated embodiments, a discussion of certain experimentation and/or theory will be provided. It is noted, however, that the embodiments herein are not necessarily limited to any such experimentation and/or theory.

Glass Compositions and Examples

Photochromic borosilicate glass compositions are disclosed having (in weight %) 66-76% $SiO_2$, 0-8% $Al_2O_3$, 10-18% $B_2O_3$, 0-4% $Li_2O$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade. Such photochromic borosilicate glass compositions may be thermally darkenable. For example, the composition may be thermally darkenable at a temperature of 150° C. or greater.

It was surprisingly found that only glasses having concentrations of Ag and Cl in the recited range resulted in glasses having thermally darkenable photochromic properties.

Also surprisingly, in some embodiments such borosilicate glasses retain their reverse photochromic properties even after ion-exchange strengthening treatment. Moreover, such ion-exchange strengthened borosilicate glasses may be thermally darkenable.

Figure 1:
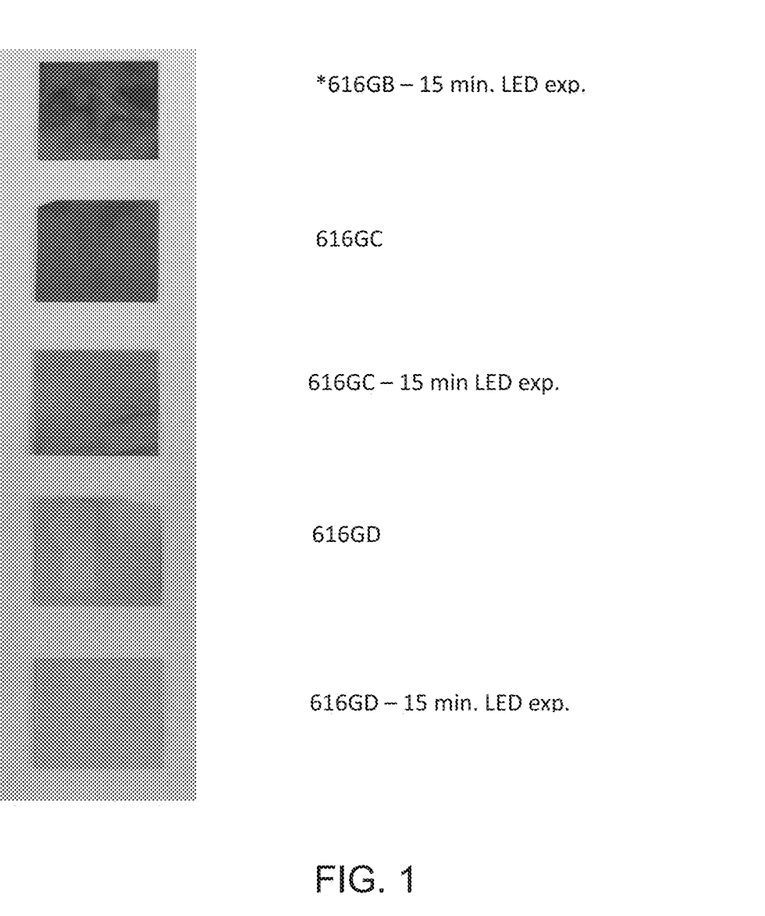
FIG. 1 is a photographic view of images of glasses before and after 15 minutes of exposure to high intensity LED white light (*616 GB is after exposure only)
Figure 2:
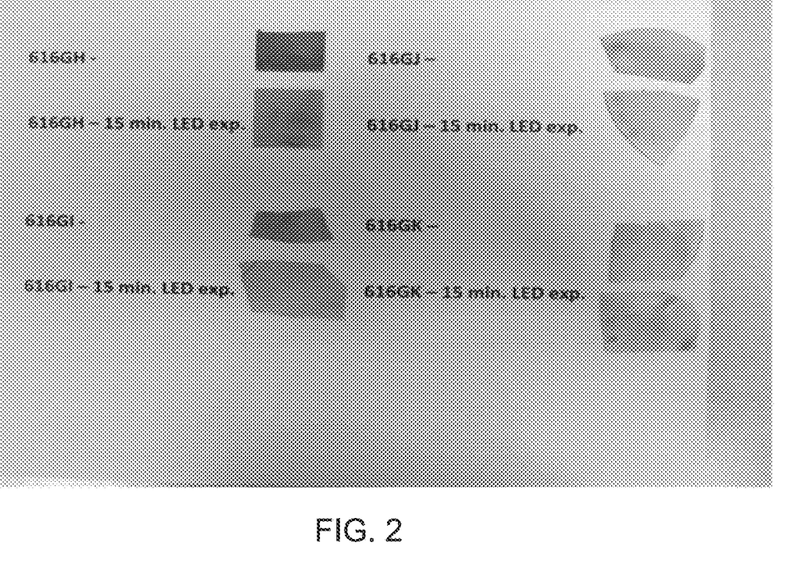
FIG. 2 is a photographic view of images of a further batch of glasses before and after 15 minutes of exposure to high intensity LED white light.
Figure 3:
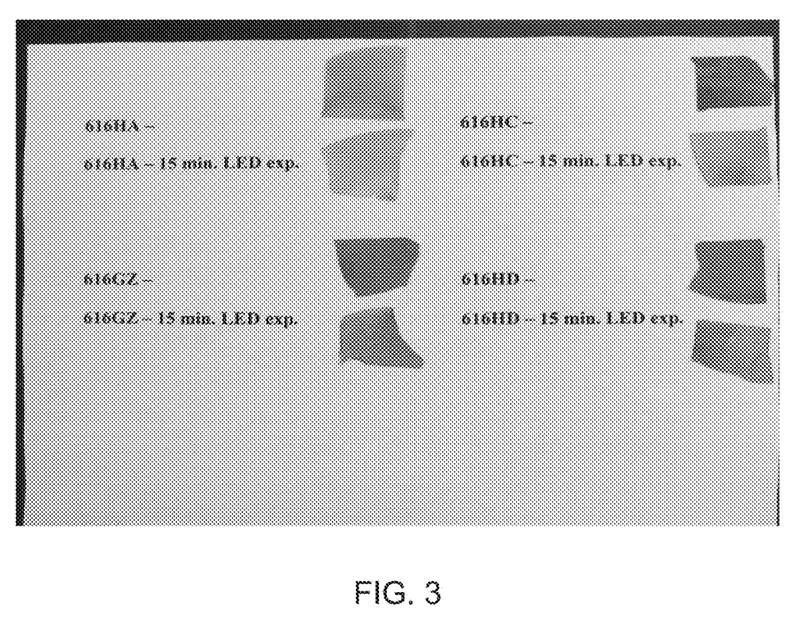
FIG. 3 is a photographic view of images of additional glasses before and after 15 minutes of exposure to high intensity LED white light.

Now referring to FIGS. 1-3 and corresponding Tables 1-3, several glasses were prepared having compositions falling within the above-recited ranges.

TABLE 1

Mol % compositions for the glasses in FIG. 1.

| Composition | 616GB | 616GC | 616GD |
|---|---|---|---|
| SiO2 | 74.6 | 74.6 | 68.6 |
| Al2O3 | 0 | 0 | 6 |
| B2O3 | 13.4 | 13.4 | 13.4 |
| K2O | 4.5 | 3 | 9 |
| Ag | 1.2 | 1.2 | 1.2 |
| Cl- | 1.8 | 1.8 | 1.8 |
| CuO | 0.03 | 0.03 | 0.03 |
| Na2O | 4.5 | 3 | 0 |
| Li2O | 0 | 3 | 0 |
| Comments | Made 4 pancakes/color red | Same, a bit more brown | More viscous |

TABLE 2

Mol % compositions for the glasses in FIG. 2.

| Composition | 616GH | 616GI | 616GJ | 616GK |
|---|---|---|---|---|
| SiO2 | 74.6 | 74.6 | 68.6 | 68.6 |
| Al2O3 | 0 | 0 | 6 | 6 |
| B2O3 | 13.4 | 13.4 | 13.4 | 13.4 |
| Na2O | 6 | 9 | 4.5 | 9 |
| K2O | 3 | 0 | 4.5 | 0 |
| CuO | 0.03 | 0.03 | 0.03 | 0.03 |
| Fe2O3 | 0 | 0 | 0 | 0 |
| NiO | 0 | 0 | 0 | 0 |
| Co3O4 | 0 | 0 | 0 | 0 |
| Ag | 1.2 | 1.2 | 1.2 | 1.2 |
| Cl- | 1.8 | 1.8 | 1.8 | 1.8 |
| Br- | 0 | 0 | 0 | 0 |
| Comments | Made 4 pancakes/red | 5 pancakes/ lighter red | More viscous | More orangish |

TABLE 3

Mol % compositions for the glasses in FIG. 3

| Composition | 616GZ | 616HA | 616HC | 616HD |
|---|---|---|---|---|
| SiO2 | 74.6 | 74.6 | 74.6 | 71.6 |
| Al2O3 | 0 | 0 | 0 | 3 |
| B2O3 | 13.4 | 13.4 | 13.4 | 13.4 |
| K2O | 3 | 3 | 3 | 3 |
| Na2O | 6 | 6 | 6 | 6 |
| Ag | 1.2 | 1.2 | 1.2 | 1.2 |
| Cl- | 1.8 | 1.8 | 1.8 | 1.8 |
| CuO | 0.03 | 0 | 0.03 | 0.03 |
| NiO | 0 | 0.03 | 0.03 | 0 |
| ZnO | 0 | 0 | 0 | 0 |
| Comments | Fluid, cord | Fluid, cord | Fluid, cord | Fluid, cord, fumey |

Experiments revealed substitution of $Cl^-$ with $Br^-$ did not result in compositions with reverse photochromic properties. Thus, in some embodiments the compositions disclosed herein are substantially free of $Br^-$.

In some embodiments the compositions disclosed herein are substantially free of Li.

Each of the samples in Tables 1-3 and corresponding FIGS. 1-3 were tested for reverse photochromic properties and thermal darkening properties according to the following methods.

Methodology

Sample Screening. Each of the samples in Tables 1-3 were found to exhibit significant color change when subjected to a preliminary screening test which involved placing the samples under a high intensity LED source for 15 minutes. The samples were cut into 1"×1"×0.5 mm squares as shown in FIGS. 1-3.

Figure 4:
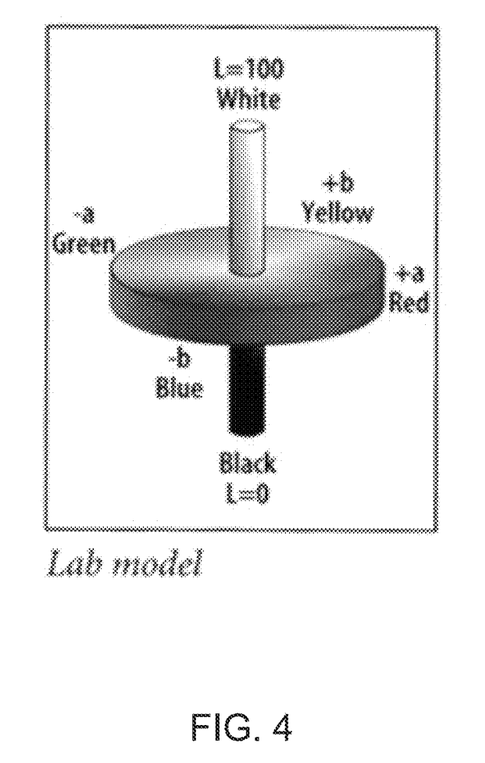
FIG. 4 is a graphical representation of a L*a*b* color scale employed in connection with establishing color coordinates of photochromic glasses made in accordance with the present disclosure.

Color Measurements. The samples were again subjected to the high intensity LED 15 minute light exposure test. These samples were then measured for their color coordinates, using a lab color coordinate model as shown in FIG. 4. Tables 4 and 5 list the color coordinate values at both the pre- and post-exposure states as a determination of change for each of the samples in FIGS. 1, 2 and 3, with the exception of sample 616 GB of FIG. 1, which depicts post-exposure state only. Exposure times of 1, 2, 5 and 15 minutes were explored and documented.

TABLE 4

Color coordinates of the photochromic glasses before and after exposure to 15 minute of white LED light. [Specular Component Inclusive (SCI) Reflective]

| Name | ill-obs | Time | L* | a* | b* |
|---|---|---|---|---|---|
| 616GB-Pre | D65-10 | 9:45 | 51.31 | 21.79 | 20.18 |
| 616GC-Pre | D65-10 | 9:48 | 59.96 | 34.97 | 47.34 |
| 616GD-Pre | D65-10 | 9:50 | 86.35 | 3.87 | 2.54 |
| 616GB-Post | D65-10 | 14:28 | 54.97 | 4.66 | 7.18 |
|  | F02-10 (CWF) |  | 55.84 | 3.51 | 8.9 |
| 616GC-Post | D65-10 | 14:31 | 71.18 | -9.19 | -2.49 |
|  | F02-10 (CWF) |  | 70.95 | -6.18 | -2.63 |
| 616GD-post | D65-10 | 14:32 | 89.58 | -1.82 | 1.71 |
| 616GH-Pre | D65-10 | 12:23 | 54.12 | 9.54 | 0.03 |
|  | F02-10 (CWF) |  | 54.97 | 7.3 | 1.15 |

TABLE 4-continued

Color coordinates of the photochromic glasses before and after exposure to 15 minute of white LED light. [Specular Component Inclusive (SCI) Reflective]

| Name | ill-obs | Time | L* | a* | b* |
|---|---|---|---|---|---|
| 616GI-Pre | D65-10 | 12:26 | 67.1 | 26.24 | 15.23 |
| | F02-10 (CWF) | | 69.89 | 17.42 | 19.1 |
| 616GJ-Pre | D65-10 | 12:29 | 74.2 | 13.74 | 5.39 |
| | F02-10 (CWF) | | 75.37 | 9.49 | 6.95 |
| 616GK-Pre | D65-10 | 12:31 | 77.07 | 14.24 | 3.73 |
| 616GH-Post | D65-10 | 15:05 | 66.52 | -6.34 | -1.91 |
| | F02-10 (CWF) | | 66.43 | -4.19 | -1.88 |
| 616GI-Post | D65-10 | 15:07 | 78.95 | -1.06 | 2.38 |
| | F02-10 (CWF) | | 79.2 | -0.61 | 3.01 |
| 616GJ-Post | D65-10 | 15:08 | 79.26 | 0.94 | 0.62 |
| | F02-10 (CWF) | | 79.5 | 0.79 | 1.03 |
| 616GK-Post | D65-10 | 15:10 | 79.93 | 6.17 | 1.32 |
| 616GH-72h | D65-10 | 16:36 | 65.54 | -7.07 | -4.67 |
| | F02-10 (CWF) | | 65.31 | -4.7 | -5.02 |
| 616GI-72h | D65-10 | 16:38 | 78.92 | -2.59 | 1.36 |
| | F02-10 (CWF) | | 79.05 | -1.65 | 1.81 |
| 616GJ-72h | D65-10 | 16:39 | 78.71 | 1.04 | 0.14 |
| | F02-10 (CWF) | | 78.92 | 0.86 | 0.48 |
| 616GK-72h | D65-10 | 16:40 | 80.07 | 6.92 | 2.5 |
| 616HA-Pre | D65-10 | 14:00 | 68.2 | 9.63 | -3.24 |
| 616GZ-Pre | D65-10 | 14:02 | 59.4 | 20.23 | 7.98 |
| 616HC-Pre | D65-10 | 14:04 | 55.94 | 14.53 | 3.36 |
| 616HD-Pre | D65-10 | 14:06 | 63.6 | 33.7 | 27.59 |
| 616HA-Post | D65-10 | 14:16 | 77.55 | 2.64 | 2.82 |
| | F02-10 (CWF) | | 78.01 | 1.75 | 3.19 |
| 616GZ-Post | D65-10 | 14:17 | 68.2 | -5.81 | -6.65 |
| | F02-10 (CWF) | | 67.71 | -3.85 | -7.47 |
| 616HC-Post | D65-10 | 14:18 | 72.11 | -9.44 | -3.15 |
| | F02-10 (CWF) | | 71.79 | -6.4 | -3.6 |
| 616HD-Post | D65-10 | 14:20 | 70.71 | 10.71 | 1.62 |

TABLE 5

Color coordinates of the photochromic glasses before and after exposure to 15 minute of white LED light. [Specular Component Exclusive (SCE) Reflective]

| Name | ill-obs | Time | L* | a* | b* |
|---|---|---|---|---|---|
| 616GB-Pre | D65-10 | 9:45 | 44.71 | 24.08 | 23.9 |
| 616GC-Pre | D65-10 | 9:48 | 54.35 | 37.08 | 57.92 |
| 616GD-Pre | D65-10 | 9:50 | 81.48 | 4 | 2.79 |
| 616GB-Post | D65-10 | 14:28 | 49.19 | 4.51 | 7.49 |
| | F02-10 (CWF) | | 50.09 | 3.48 | 9.27 |
| 616GC-Post | D65-10 | 14:31 | 66.32 | -9.34 | -3.7 |
| | F02-10 (CWF) | | 66.03 | -6.25 | -4.01 |
| 616GD-post | D65-10 | 14:32 | 84.64 | -1.77 | 1.89 |
| 616GH-Pre | D65-10 | 12:23 | 48.46 | 10.62 | -1.62 |
| | F02-10 (CWF) | | 49.3 | 8.14 | -0.64 |
| 616GI-Pre | D65-10 | 12:26 | 61.78 | 27.66 | 15.71 |
| | F02-10 (CWF) | | 64.69 | 18.32 | 19.66 |
| 616GJ-Pre | D65-10 | 12:29 | 69.08 | 14.29 | 5.76 |
| | F02-10 (CWF) | | 70.29 | 9.88 | 7.38 |
| 616GK-Pre | D65-10 | 12:31 | 72.67 | 14.48 | 3.87 |
| 616GH-Post | D65-10 | 15:05 | 62.07 | -6.97 | -4.25 |
| | F02-10 (CWF) | | 61.83 | -4.59 | -4.58 |
| 616GI-Post | D65-10 | 15:07 | 74.05 | -0.66 | 1.5 |
| | F02-10 (CWF) | | 74.29 | -0.31 | 2.03 |
| 616GJ-Post | D65-10 | 15:08 | 74.45 | 1.06 | 0.89 |
| | F02-10 (CWF) | | 74.71 | 0.89 | 1.35 |
| 616GK-Post | D65-10 | 15:10 | 74.79 | 6.59 | 1.24 |
| 616GH-72h | D65-10 | 16:36 | 60.51 | -7.04 | -6.63 |
| | F02-10 (CWF) | | 60.18 | -4.62 | -7.25 |
| 616GI-72h | D65-10 | 16:38 | 73.96 | -2.11 | 0.61 |
| | F02-10 (CWF) | | 74.09 | -1.3 | 0.98 |
| 616GJ-72h | D65-10 | 16:39 | 73.71 | 0.99 | 0.21 |
| | F02-10 (CWF) | | 73.93 | 0.84 | 0.56 |
| 616GK-72h | D65-10 | 16:40 | 75.31 | 7.08 | 2.53 |
| 616HA-Pre | D65-10 | 14:00 | 64.82 | 9.95 | -4.11 |
| 616GZ-Pre | D65-10 | 14:02 | 53.45 | 21.74 | 9.02 |
| 616HC-Pre | D65-10 | 14:04 | 49.87 | 15.88 | 3.34 |
| 616HD-Pre | D65-10 | 14:06 | 57.85 | 35.93 | 1.42 |
| 616HA-Post | D65-10 | 14:16 | 73.39 | 2.68 | 1.49 |
| | F02-10 (CWF) | | 73.78 | 1.8 | 1.66 |
| 616GZ-Post | D65-10 | 14:17 | 62.76 | -6.38 | -7.05 |
| | F02-10 (CWF) | | 62.23 | -4.23 | -7.96 |
| 616HC-Post | D65-10 | 14:18 | 67.39 | -9.56 | -3.46 |
| | F02-10 (CWF) | | 67.05 | -6.47 | -3.98 |
| 616HD-Post | D65-10 | 14:20 | 65.52 | 10.83 | 1.91 |

The exposure times indicate that most of the color change occurred during the first minute of exposure under the high intensity LED light source. Each of the samples showed some degree of reverse photochromic behavior.

Heat Treatment. The impact of temperature on color change was observed on the reverse photochromic glasses of FIGS. 1-3, each of which were previously exposed to the above-referenced high intensity LED light source for 15 minutes. Experiments were conducted in which the samples were subjected to heat. For sample 616HD, testing began starting at 500° C. and progressed downward in temperature in 50° C. increments, each time re-exposing the glass sample to high intensity LED light for 5 minutes to permit it to revert to its original color before the next incremental heat application. The results are tabulated in Table 6.

TABLE 6

Fictivation Temperature at 2 Minutes w/Quench

| Glass Code | 500° C. | 450° C. | 400° C. | 350° C. | 300° C. | 250° C. | 200° C. | 150° C. | 100° C. |
|---|---|---|---|---|---|---|---|---|---|
| 616HD | Revert to original color/pre-exposure | Revert to original color/pre-exposure | Slight color change | Slight color change | Slight color change | Slight color change | Subtle change from previous | Color change starts to occur | No change observed/exposed color |

The data reveals sample 616HD to be thermally darkenable, i.e., exposure to heat changed the exposed glass back to its original color state.

For each of the remaining samples, heat treatment started at 100° C. and progressed upward in 50° C. increments until color change was observed. The results are tabulated in Table 7. The difference in testing method compared to that used for the sample in Table 6 was due to the ease with which the furnace could be controlled in the latter method. The method used for samples listed in Table 7 also did not require re-exposing the glass samples after every heat application.

TABLE 7

Fictivation Temperature at 2 Minutes w/Quench

| Glass Code | 300° C. | 250° C. | 200° C. | 150° C. | 100° C. |
|---|---|---|---|---|---|
| 616HA | | Color change starts to occur | No change observed/exposed color | No change observed/exposed color | No change observed/exposed color |
| 616HC | | Color change starts to occur | No change observed/exposed color | No change observed/exposed color | No change observed/exposed color |
| 616GZ | | Color change starts to occur | No change observed/exposed color | No change observed/exposed color | No change observed/exposed color |
| 616GH | Color change starts to occur | No change observed/exposed color | No change observed/exposed color | No change observed/exposed color | No change observed/exposed color |
| 616GI | Color change starts to occur | No change observed/exposed color | No change observed/exposed color | No change observed/exposed color | No change observed/exposed color |
| 616GJ | Color change starts to occur | No change observed/exposed color | No change observed/exposed color | No change observed/exposed color | No change observed/exposed color |
| 616GK | Color change starts to occur | No change observed/exposed color | No change observed/exposed color | No change observed/exposed color | No change observed/exposed color |
| 616GB | Color change starts to occur | No change observed/exposed color | No change observed/exposed color | No change observed/exposed color | No change observed/exposed color |
| 616GC | Color change starts to occur | No change observed/exposed color | No change observed/exposed color | No change observed/exposed color | No change observed/exposed color |
| 616GD | Color change starts to occur | No change observed/exposed color | No change observed/exposed color | No change observed/exposed color | No change observed/exposed color |

The data reveal each of the samples to be thermally darkenable, i.e., exposure to heat changed the exposed glass back to its original color state.

Ion Exchange Glass

In applications where a glass should exhibit high strength, the strength of conventional glass may be enhanced by chemical strengthening (ion exchange). Ion exchange (IX) techniques can produce high levels of compressive stress in the treated glass, as high as about −400 to −1000 MPa at the surface, and is suitable for very thin glass. One such IX glass is Corning Gorilla® Glass available from Corning Incorporated.

Ion exchange is carried out by immersion of a glass sheet into a molten salt bath for a predetermined period of time, where ions within the glass sheet at or near the surface thereof are exchanged for larger metal ions, for example, from the salt bath. By way of example, the molten salt bath may include $KNO_3$, the temperature of the molten salt bath may within the range of about 400-500° C., and the predetermined time period may be within the range of about 2-24 hours, and more specifically between about 2-10 hours. The incorporation of the larger ions into the glass strengthens the sheet by creating a compressive stress in a near surface region. A corresponding tensile stress is induced within a central region of the glass sheet to balance the compressive stress. Sodium ions within the glass sheet may be replaced by potassium ions from the molten salt bath, though other alkali metal ions having a larger atomic radius, such as rubidium or cesium, may replace smaller alkali metal ions in the glass. According to particular embodiments, alkali metal ions in the glass sheet may be replaced by Ag+ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass sheet that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of compressive layer. The depth of compressive layer will in some cases be greater than about 15 microns, and in some cases greater than 20 microns, to give the highest protection against surface damage.

Ion-exchangeable glasses that are suitable for use in the embodiments herein include borosilicate glasses. As used herein, "ion exchangeable" means that a glass is capable of exchanging cations located at or near the surface of the glass with cations of the same valence that are either larger or smaller in size.

Compositions of Ion-Exchange Strengthened Glasses with Reverse Photochromic Properties Borosilicate glasses having reverse photochromic properties which may be chemically strengthened in a potassium salt bath disclosed herein include the following range of compositions (mol %): 66-76 $SiO_2$, 2-8 $Al_2O_3$, 10-18 $B_2O_3$, 0-4 $Li_2O$, 4-12 $Na_2O$, 0-6 $K_2O$, 1-1.5 Ag, 1.5-2.5 Cl$^-$, wherein $Na_2O > K_2O$ and the summed amount of CuO and NiO is 0.01-0.06.

A nonzero level of [$Al_2O_3$] is desired since alumina is a key enabler of effective ion exchange in terms of both ion mobility and obtaining the desired level of compressive stress. Also, the concentration of $Na_2O$ in the composition should be sufficiently high relative to $K_2O$ to enable strengthening.

Experiments - Ion Exchange

Figure 5:
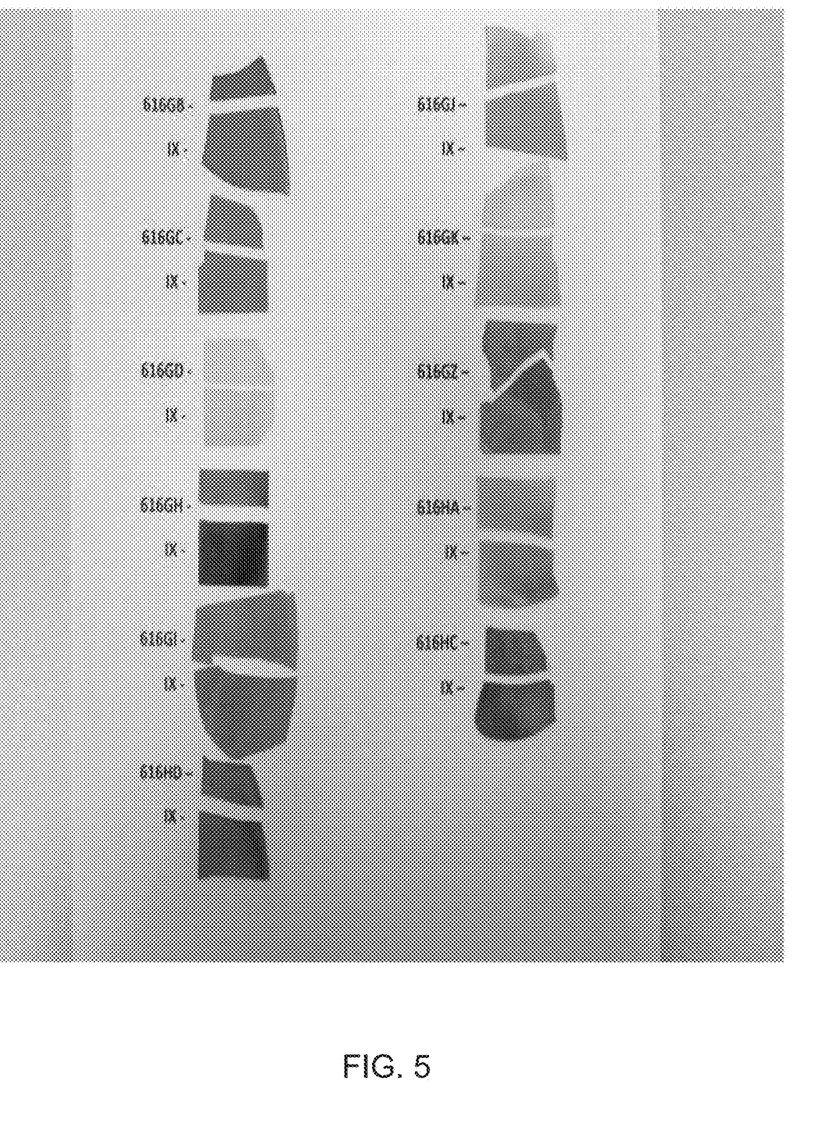
FIG. 5 is a photographic view of images of glasses before and after ion exchange (IX) in refined $KNO_3$ (370° C./8 hours); all images are before exposure to the white LED light.

After determining the minimum temperature required to undo color change, all glass samples in Tables 1-3 and shown in FIGS. 1-3, in their original "as received" state were subjected to ion exchange for 8 hours at 370° C. with refined $KNO_3$. FIG. 5 depicts samples in their pre-ion exchange state and their post-ion exchange state (labeled "IX"). It is noted that ion exchange also contributed to some degree of color change on at least some of the sample glasses as seen in FIG. 5.

Figure 6:
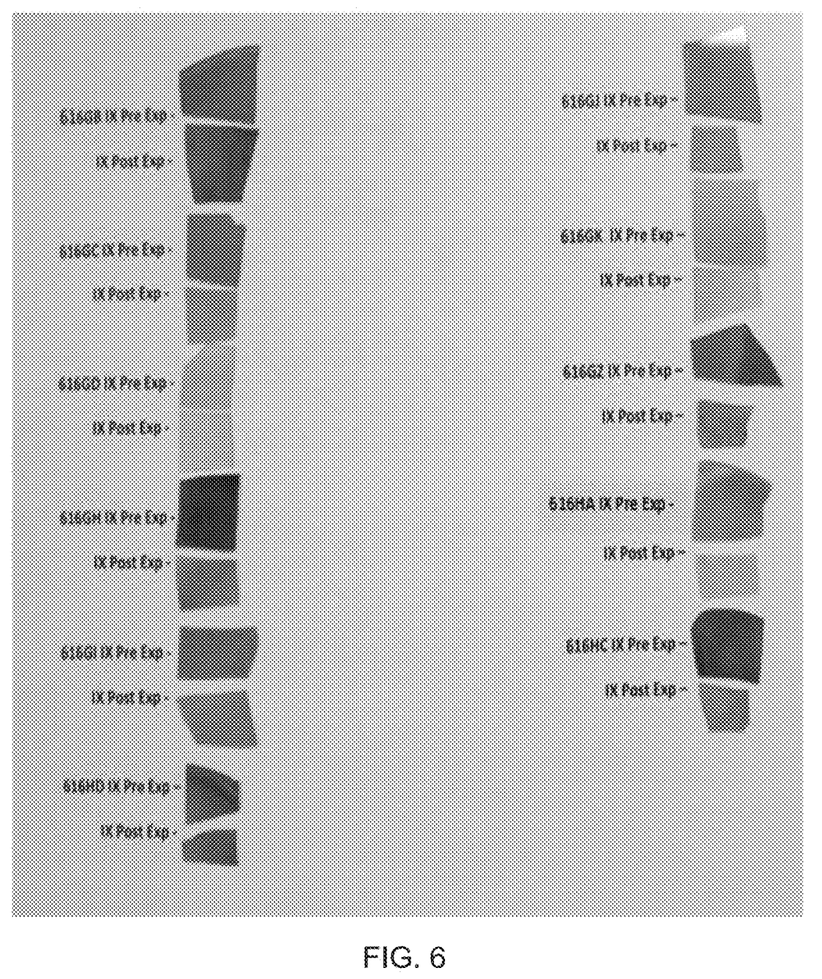
FIG. 6 is a photographic view of images of glasses subjected to ion exchange (IX) processes, including images of glass samples prior to exposure to LED light and the same samples after 15 minutes of exposure to LED light.

With reference to FIG. 6, ion exchanged (IX) samples were placed under a LED light source for 15 minutes of exposure to observe if a change in color still occurs. All samples exhibited a noticeable degree of color change, from darker ground state to lighter, after light exposure, as depicted in FIG. 6, showing that even after ion strengthening the glasses retain their reverse photochromic properties.

Table 8 provides FSM data for samples subjected to ion exchange treatment for 8 hours at 370° C. with refined $KNO_3$. Stress measurements were taken using an Orihara FSM-6000LE measurement instrument on all the ion-exchange strengthened samples. Only three glass sample compositions (those having sufficiently high [$Na_2O$]) had enough modes for recordable data, six glass samples having one mode and two samples having no visible modes.

on the substrate 102. In a broad aspect, the structure 100 includes the substrate 102 having first surface (not shown) and second, opposing surface 106, and at least one reverse photochromic borosilicate glass layer 104 substantially covering the substrate 102. It is noted that the phrase "substantially covering" herein means that the superior layer (i.e., the layer 104) overlies the inferior layer (i.e., the substrate 102) either directly or indirectly through one or more intermediate layers. In one or more embodiments, the layer 104 may be disposed on either or both sides of the substrate 102. In the embodiment illustrated in FIG. 8, there are no intermediate layers shown between, for example, the layer 104 and the substrate 102, although such intermediate layers are contemplated.

Figure 8:
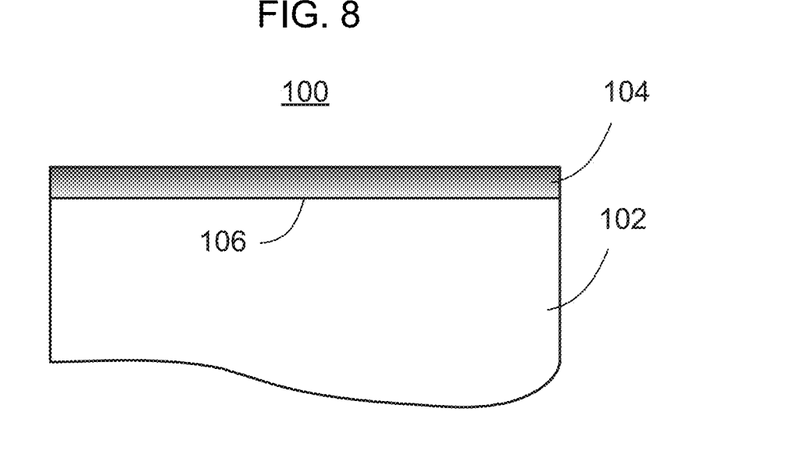
FIG. 8 is a schematic, side view of the glass substrate of FIG. 7 taken through cross-sectional line 2-2.

The reverse photochromic borosilicate glass layer 104 may be formed via a single layer of material. The reverse photochromic borosilicate glass layer 104 may be strengthened by ion-exchange processes disclosed herein. Those skilled in the art will appreciate from the disclosure herein that the details presented will readily enable a skilled artisan to employ one or more methodologies for applying layer 104 by applying well-known layering techniques.

Substrate Material and Characteristics

In the illustrated examples, the substrate 102 is substantially planar, although other embodiments may employ a curved or otherwise shaped or sculpted substrate 102. Additionally or alternatively, the thickness of the substrate 102 may vary, for aesthetic and/or functional reasons, such as

TABLE 8

FSM Data for Samples Subjected to Ion Exchange Treatment for 8 Hours at 370° C. with Refined $KNO_3$

| Glass Code | Side A 0° CS (mPa) | Side A 90° CS (mPa) | Side A 180° CS (mPa) | Side A 270° CS (mPa) | Side A 0° DOL Upper (μm) | Side A 90° DOL Upper (μm) | Side A 180° DOL Upper (μm) | Side A 270° DOL Upper (μm) | Side A 0° DOL Lower (μm) | Side A 90° DOL Lower (μm) | Side A 180° DOL Lower (μm) | Side A 270° DOL Lower (μm) |
|---|---|---|---|---|---|---|---|---|---|---|---|---|
| 616HD | 323.754 | 309.076 | 319.75 | 314.027 | 12.425 | 9.198 | 13.965 | 13.921 | 14.16 | 9.94 | 14.255 | 16.058 |
| 616HC | Only one mode | | | | | | | | | | | |
| 616HA | Only one mode | | | | | | | | | | | |
| 616GZ | Only one mode | | | | | | | | | | | |
| 616GK | 495.137 | 495.329 | 494.882 | 494.525 | 14.7 | 14.681 | 14.661 | 14.659 | 14.302 | 14.277 | 14.274 | 14.259 |
| 616GJ | 256.833 | 254.473 | 259.594 | 253.947 | 24.659 | 21.413 | 24.725 | 24.752 | 27.383 | 24.007 | 23.871 | 23.866 |
| 616 GI | Only one mode for GI and GH | | | | | | | | | | | |
| 616GH | | | | | | | | | | | | |
| 616GD | 0 modes | | | | | | | | | | | |
| 616GC | Only one mode | | | | | | | | | | | |
| 616GB | 0 modes | | | | | | | | | | | |

Devices

General Structure and Considerations

Figure 7:
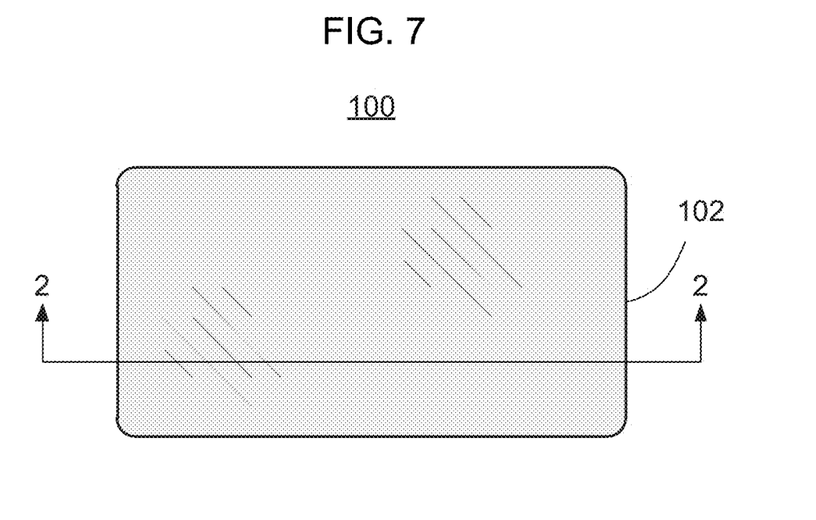
FIG. 7 is a schematic view of a glass substrate with a layer of material.

With reference to FIG. 7, a structure 100 may include a substrate 102 of interest in connection with the development of novel processes and structures to improve the photochromic properties of the substrate 102. For example, the substrate 102 material may be glass, specifically Gorilla® Glass from Corning Incorporated, which is an ion-exchange glass, usually an alkali aluminosilicate glass or alkali aluminoborosilicate glass. Those skilled in the art will appreciate that the specific substrate material is not limited to glass, or Gorilla® Glass in particular, however, such material was selected for experimentation and example.

As mentioned above, the addition of a reverse photochromic layer on the substrate 102 may provide reverse photochromic properties to the structure 100.

With reference to FIG. 8, one or more embodiments herein provide for a structure 100 having a substrate 102 and a reverse photochromic borosilicate glass layer 104 disposed employing a higher thickness at edges of the substrate 102 as compared with more central regions.

The substrate 102 may be formed of any suitable material, such as from at least one of quartz, glass, glass-ceramic, oxide glass, ion exchanged glass, polymer, combinations thereof, or other material(s).

When the substrate 102 is formed of glass or glass ceramic materials, then any suitable glass composition may be employed, such as soda lime glass ($SiO_2$, $Na_2O$, CaO, etc.), metallic alloy glasses, ionic melt glass, polymer glasses (acrylic glass, polycarbonate, polyethylene terephthalate), etc.

Process Considerations

Skilled artisans will appreciate that the mechanical properties of a layer (such as the layer 104) are closely related to the material composition, processing condition and material structures. Therefore, various techniques and methods are available to the artisan to achieve desired elastic (and/or hardness) gradient characteristics. Among the techniques available to the artisan is to control the deposition processing conditions, such as temperature, cooling profile, etc., to adjust residual stress and materials structure to reach a particular modulus (or hardness) gradient.

Another technique is to utilize a deposition method, such as atomic layer deposition (ALD) to deposit monolayer materials of differing elastic modulus (and/or hardness) to achieve the desired gradient. Atomic layer deposition (ALD) has emerged as a useful technique for depositing thin films for a variety of applications. Although semiconductor processing has been one of the main applications for the recent developments in ALD processing, the conformality capabilities achieved by ALD on high aspect structures has applicability to the instant application. Indeed, most ALD processes are based on binary reaction sequences where two surface reactions occur and deposit a binary compound film. As there are only a finite number of surface sites, the reactions are limited to depositing a finite number of surface species. If each of the two surface reactions is self-limiting, then the two reactions may proceed in a sequential fashion to deposit a thin film with atomic level control. Thus, in connection with the instant situation whereby the layer 104 (having the aforementioned gradient) is to be applied to the substrate 102, the advantages of the ALD process include: (i) precise thickness control at the Angstrom or monolayer level; and (ii) excellent step coverage and conformal deposition on high aspect ratio structures.

Those skilled in the art will appreciate, however, that the particular mechanism by which the layers 104 are applied is not strictly limited to the aforementioned techniques, but rather may be selected by the artisan in order to address the exigencies of a particular product application or manufacturing goal.

Thickness of the Layer

In most cases, the layer 104 is relatively thin, e.g., the layer 104 will generally have a thickness within some range. For example, contemplated thickness ranges include at least one of: (i) between about 10-200 nm; (ii) between about 20-100 nm; and (iii) between about 30-90 nm. Such ranges may be suited for a particular functional property, for example, the application of a layer 104 for thin film transistor applications, sensor applications, and display device applications such as monitor and telecommunication device applications. Still further contemplated thickness ranges include at least one of: (i) between about 50-10,000 nm; (ii) between about 500-10,000 nm; and (iii) between about 1000-2000 nm.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

What is claimed is:

1. A photochromic borosilicate glass composition comprising (in weight %) 66-76% $SiO_2$, 0-8% $Al_2O_3$, 10-18% $B_2O_3$, 0-4% $Li_2O$, 0-12% $Na_2O$, 0-12% $K_2O$, 1-1.5% Ag, 1.5-2.5% $Cl^-$ and 0.01-0.06% of a summed amount of CuO and NiO, wherein the glass composition is bleachable upon exposure to ultraviolet irradiation from a stable state color or shade to a lighter color or shade.

2. The photochromic borosilicate glass composition of claim 1 wherein the glass is thermally darkenable.

3. The photochromic borosilicate glass composition of claim 2 wherein the glass composition is thermally darkenable at a temperature of 150° C. or greater.

4. The photochromic borosilicate glass composition of claim 1 comprising 2-12% $Na_2O$.

5. The photochromic borosilicate glass composition of claim 1 which is substantially free of at least one of $Li_2O$ or $Br^-$.

6. The photochromic borosilicate glass composition of claim 1 comprising 2-8% $Al_2O_3$, 4-12% $Na_2O$ and 0-6% $K_2O$, wherein the weight % of $Na_2O$ is greater than the weight % of $K_2O$.

7. The photochromic borosilicate glass of claim 6 which is substantially free of at least one of $Li_2O$ or $Br^-$.

8. The photochromic borosilicate glass composition of claim 1 comprising 68.6-71.6% $SiO_2$, 3-6% $Al_2O_3$, 13.4% $B_2O_3$, 4.5-9% $Na_2O$, 0-4.5% $K_2O$, 1.2% Ag, 1.8% $Cl^-$ and 0.03% CuO, wherein the weight % of $Na_2O$ is greater than the weight % of $K_2O$ and the composition is substantially free of $Li_2O$ and $Br^-$.

9. The photochromic borosilicate glass composition of claim 1 wherein immersion of the photochromic borosilicate glass composition in a molten salt bath for a predetermined time and temperature causes ion-exchange.

10. A multi-layer glass laminate comprising a substrate layer and at least one photochromic borosilicate glass layer comprising the photochromic borosilicate glass composition of claim 1.

11. A multi-layer glass laminate comprising a substrate layer and a photochromic borosilicate glass layer disposed on both sides of the substrate layer and comprising the photochromic borosilicate glass composition of claim 1.

12. A multi-layer glass laminate, wherein one or more layers of the multi-layer glass laminate comprises the photochromic borosilicate glass composition of claim 1.

13. A photochromic borosilicate glass composition, which when exposed to ultraviolet irradiation exhibits a lightening in color or shade and is thermally darkenable, the photochromic borosilicate glass composition comprising (in weight %) 66-76% $SiO_2$, 2-8% $Al_2O_3$, 10-18% $B_2O_3$, 0-4% $Li_2O$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is substantially free of $Br^-$.

14. The photochromic borosilicate glass composition of claim 13 comprising 1.2% Ag and 1.8% $C_-$.

15. The photochromic borosilicate glass composition of claim 13 comprising 13.4% $B_2O_3$.

16. The photochromic borosilicate glass composition of claim 13 which is substantially free of $Li_2O$.

17. The photochromic borosilicate glass composition of claim 13 comprising 6% $Al_2O_3$, 13.4% $B_2O_3$, 4.5% $Na_2O$, 1.2% Ag, 1.8% $Cl^-$ and 0.03% CuO.

18. The photochromic borosilicate glass composition of claim 13 comprising 6% $Al_2O_3$, 13.4% $B_2O_3$, 9% $Na_2O$, 1.2% Ag, 1.8% $Cl^-$ and 0.03% CuO, wherein the composition is substantially free of $K_2O$.

19. The photochromic borosilicate glass composition of claim 13 comprising 3% $Al_2O_3$, 13.4% $B_2O_3$, 3% $K_2O$, 6% $Na_2O$, 1.2% Ag, 1.8% $Cl^-$ and 0.03% CuO.

20. A method of strengthening a glass composition comprising: immersing in a molten salt bath a photochromic borosilicate glass composition comprising (in weight %) 66-76% $SiO_2$, 2-8% $Al_2O_3$, 10-18% $B_2O_3$, 0-4% $Li_2O$, 2-12% $Na_2O$, 0-12% $K_2O$, 1-1.5% Ag, 1.5-2.5% $Cl^-$ and 0.01-0.06% of a summed amount of CuO and NiO, wherein the photochromic borosilicate glass composition is bleachable upon exposure to ultraviolet irradiation from a stable state color or shade to a lighter color or shade, and wherein the photochromic borosilicate glass composition is immersed in the molten salt bath for a time and at a temperature sufficient to cause ion-exchange.

* * * * *

UNITED STATES PATENT AND TRADEMARK OFFICE
CERTIFICATE OF CORRECTION

PATENT NO. : 9,527,769 B2
APPLICATION NO. : 14/508548
DATED : December 27, 2016
INVENTOR(S) : John Christopher Mauro et al.

It is certified that error appears in the above-identified patent and that said Letters Patent is hereby corrected as shown below:

On the Title Page

In item (56), in Column 2, under "Other Publications", Line 4, delete "themochromism" and insert -- thermochromism --.

In item (56), in Column 2, under "Other Publications", Line 10, delete "AgCI and CuCI" and insert -- AgCl and CuCl --.

In item (56), in Column 2, under "Other Publications", Line 12, delete "telluritc" and insert -- tellurite --.

In item (56), in Column 2, under "Other Publications", Line 24, delete "133," and insert -- 144, --.

In the Claims

In Column 14, Line 13, in Claim 7, delete "glass" and insert -- glass composition --.

In Column 14, Line 46, in Claim 14, delete "C_." and insert -- Cl$^-$. --.

Signed and Sealed this
First Day of August, 2023

Katherine Kelly Vidal
*Director of the United States Patent and Trademark Office*